United States Patent [19]

Klein et al.

[11] 4,252,415
[45] Feb. 24, 1981

[54] LIQUID CRYSTAL CELL AND PROCESS FOR ITS PRODUCTION

[75] Inventors: Hans-Peter Klein, Nussbaumen; Hans-Rudolf Zeller, Birr, both of Fed. Rep. of Germany

[73] Assignee: BBC Brown, Boveri & Cie, Baden, Switzerland

[21] Appl. No.: 923,678

[22] Filed: Jul. 11, 1978

[30] Foreign Application Priority Data

Sep. 6, 1977 [CH] Switzerland .................. 10838/77

[51] Int. Cl.³ ............................................ G02F 1/133
[52] U.S. Cl. ...................................... 350/343; 106/53
[58] Field of Search ............... 350/341, 339, 343, 344; 106/53

[56] References Cited

U.S. PATENT DOCUMENTS

| | | | |
|---|---|---|---|
| 3,370,966 | 2/1968 | Schwartz et al. | 106/53 X |
| 3,995,941 | 12/1976 | Nagahora et al. | 350/343 |
| 4,099,977 | 7/1978 | Francel et al. | 106/53 |
| 4,158,485 | 6/1979 | Mueller et al. | 350/343 |

*Primary Examiner*—Edward S. Bauer
*Attorney, Agent, or Firm*—Oblon, Fisher, Spivak, McClelland & Maier

[57] ABSTRACT

A liquid crystal cell with two flat glass plates aligned parallel to one another and at a distance from one another, a web of low-melting glass solder provided between the glass plates, a liquid crystal substance provided in the inner space formed by the glass plates and the glass solder web and with electrodes applied on the surfaces of the glass plates facing one another, the connections of which are brought out of the inner space via the glass solder web, wherein the glass solder web and/or the electrodes contain an at least partly reduced oxidizing agent which is formed by the reduction of an oxidizing agent during the glass soldering of the liquid crystal cell.

6 Claims, 2 Drawing Figures

LIQUID CRYSTAL CELL AND PROCESS FOR ITS PRODUCTION

BACKGROUND OF THE INVENTION

1. Field of the Invention

This invention relates to a liquid crystal cell with two flat glass plates aligned parallel to one another and at a distance from one another, a web of low-melting glass solder provided between the glass plates, a liquid crystal substance provided in the inner space formed by the glass plates and the glass solder web and with electrodes applied on the surfaces of the glass plates facing one another, the connections of which are brought out of the inner space via the glass solder web, and a process for the production of such a liquid crystal cell.

2. Description of the Prior Art

A liquid crystal cell of the above-mentioned type is known from U.S. Pat. No. 3,995,941. Such cells are manufactured nowadays mainly as optical polarization modulators with a twisted nematic liquid crystal substance, such as is stated for example in DT-OS No. 2,158,563. In the bulk manufacture of such rotated crystal cells the glass plates provided with the electrodes are printed on the edge preferably with a solder paste containing a lead borate solder and an organic binder and are soldered at about 500° C. after aligning the glass plates in relation to one another.

By means of various known processes, such as rubbing, oblique vaporizing, the liquid crystal molecules resting on the glass plate are aligned in a preferential direction. For most applications a small angle of incidence, that is to say the angle between the axis of the rod-shaped liquid crystal molecule and its projection on the surface of the plate, is advantageous. Under all circumstances it must be avoided that the angle of incidence varies over the surface of the cell, for example between the parts covered by electrodes and the parts not covered by electrodes.

Such cells when observed from a non-vertical point of view generally project a background which is not homogeneous or electrodes which are visible, even when they are in a condition which is not electrically switched on.

In cells produced according to prior art it frequently occurs that the angle of incidence on the electrode-covered parts of the glass plate is higher than on the parts which are not so covered. This leads to unacceptable optical properties and to a shortened working life of such cells. In principle the effect can be reduced by a coating of the glass plate and the electrodes with a high-quality protective layer, for example 2000 Å $SiO_2$, applied by electron beam vaporization in a very good vacuum. Such protective layers, however, are expensive and there is a need for a cheaper process.

SUMMARY OF THE INVENTION

Accordingly, it is one object of this invention to provide a novel liquid crystal cell of the above-mentioned type in which the value of the angle of incidence of the liquid crystal molecules is smaller than a prescribed tolerance figure, and in which, as a result of the tolerance figure for the angle of incidence, a liquid crystal cell is provided which is suitable for practical applications with regard to contrast and working life.

A further object of the invention is to provide a simple process which differs only slightly from the previously employed manufacturing processes, by means of which such a liquid crystal cell can be produced.

These and other objects are achieved according to the invention in that the glass solder web and/or the electrodes contain an at least partly reduced oxidizing agent which is formed by the reduction of an oxidizing agent during the glass soldering of the liquid crystal cell.

The process according to the invention is characterized by the fact that the oxidizing agent is mixed with glass solder and that a glass solder paste containing this mixture and an organic binder is applied in a known manner on at least one of the two glass solder plates provided with electrodes, the glass plates are aligned in relation to one another in a known manner and are soldered, and the inner space formed by the glass plates and the glass solder web is filled with the liquid crystal substance in a manner in itself known.

The invention is based on the observation that too large angles of incidence of the liquid crystal molecules located above the tolerance value are restricted to the zones of the electrodes, that the disorders caused by this occur on the electrodes, the feed leads of which have a common surface with the glass solder web, and that the effect of these disorders increases as the soldering temperature increases and can be reduced considerably sometimes by means of protective layers applied on the electrodes.

The invention is now based on the knowledge that these disorders are caused by the fact that at the soldering temperature the whole organic binder of the glass solder paste is not yet combusted, so that in the glass solder, and especially at the boundary surface to the electrode, reducing conditions occur which lower the electrochemical potential of the electrode in the part located underneath the glass solder web according to the composition of the electrode. In the indium and/or tin oxide electrodes generally used in the manufacture of liquid crystal cells, this lowering is approximately 0.5 volts. Since at the soldering temperature which is about 500° C. the sodium silicate glass usually employed in the manufacture is a very good electrolyte, the reduced and the unreduced parts of the electrode act as a local element and cause electrochemical corrosion effects as a result of which, possibly by $Na^+$ diffusion from the glass plate into the electrode, the too great angles of incidence of the liquid crystal molecules are created in the area of the electrodes.

In light of the above-described discovery, it is necessary to prevent the lowering of the oxygen activity in the glass solder and consequently also at the boundary surface between glass solder and electrode during the glass soldering of the liquid crystal cell. In order to achieve this aim, according to the invention an oxidizing agent is added to the glass solder which during the glass soldering of the liquid crystal cell oxidizes the uncombusted residues of the organic binder of the glass solder paste and in so doing is itself at least partly reduced, so that a liquid crystal cell soldered in this way contains in the glass solder web and/or in the electrodes a reduced oxidizing agent in addition to any unreduced parts of the oxidizing agent.

As an oxidizing agent it is advantageous to use substances which give off oxygen at high temperature, such as for example antimony pentoxide ($Sb_2O_5$), bismuth trioxide ($Bi_2O_3$), uranium trioxide ($UO_3$), nickel trioxide ($Ni_2O_3$), lead oxide ($PbO_2$), manganese dioxide ($MnO_2$), chromates and dichromates.

Particularly suitable are substances whose oxygen activity at the soldering temperature is greater than −400 (mV), preferably greater than −200 (mV). At 500° C. this corresponds to an oxygen decomposition pressure between $3 \cdot 10^{-3}$ and $6 \cdot 10^{-2}$ (bar).

The cells according to the invention are characterized by a high contrast intensity and also a long working life even when read at large angles to the normal. During manufacture no problems occur with cells whose angles of incidence are above a tolerance angle or whose angles of incidence vary beyond the utilizable cell area, so that the reject quota in regard to such disorders is practically negligible and a considerable decrease in cost and improvement of the liquid crystal cells is achieved.

If an oxidizing agent is chosen whose oxygen partial pressure in the temperature range between the softening temperature of the glass solder and the maximum temperature occurring during the glass soldering is at most equal to the pressure of the surrounding atmosphere, preferably at most 0.2 bar, it is possible to avoid a formation of bubbles occurring in the solder web and to achieve a particularly low quota of rejects.

Manganese dioxide is particularly advantageous as a oxidizing agent because it does not give off molecular oxygen to the surrounding air until 535° C., that is to say above the soldering temperature which is approximately 500° C., and therefore at the soldering temperature does not yet tend to form bubbles, but at this temperature displays a sufficiently high oxygen activity to prevent the formation of local elements on the electrodes. Furthermore, manganese dioxide is characterized by a flat oxygen activity curve plotted against the temperature, and practically does not dissolve in glass solder, so that the previous soldering parameters of the glass solder used do not have to be changed.

It is recommended to add 0.1 to 20, preferably 1 to 5, percent by weight of oxidizing agent, reckoned on the quantity of glass solder, to the glass solder and to mix uniformly with one another the glass solder and the oxidizing agent, because in this way one ensures that the oxidizing agent can carry out its oxidizing effect in all the potentially troublesome places.

It is advantageous to use a powdered oxidizing agent with a particle size which corresponds at most to the distance between the plates, because then no problems can occur in regard to the seal of the soldered liquid crystal cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
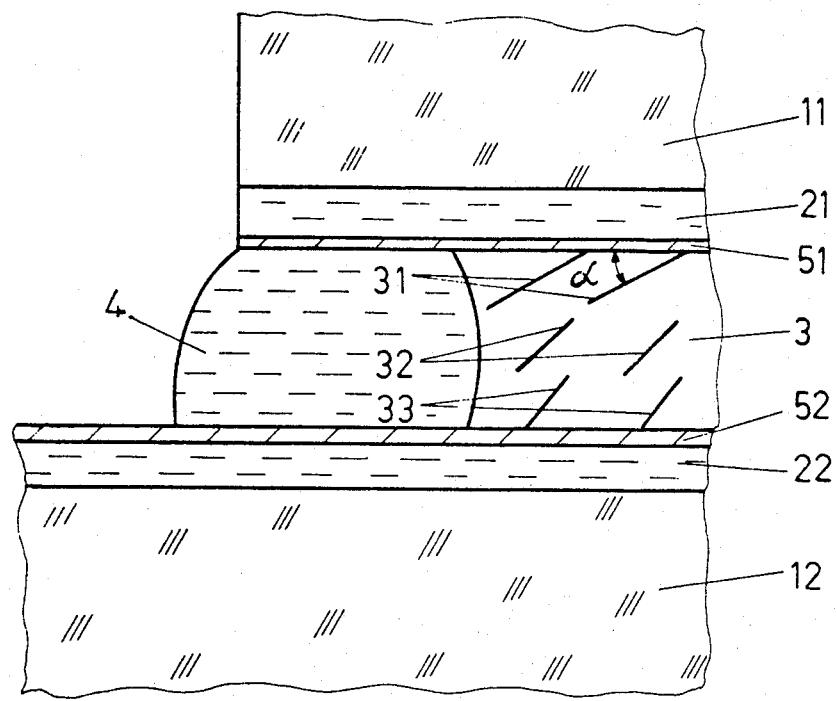
FIG. 1 is a cross-sectional view, not to scale, through the glass solder web of an electrically controlled liquid crystal cell according to prior art; and, FIG. 2 shows voltage/temperature curves of electrode arrangements corresponding to the liquid crystal cell according to FIG. 1 and also liquid crystal cells according to the invention, which have been produced with the addition of different proportions of manganese dioxide as oxidizing agent to the glass solder.

Referring now to the drawings and more particularly to FIG. 1 thereof, the reference numbers 11 and 12 designate two flat glass plates aligned parallel to one another and at a distance of approximately 7 μm, on which there are applied two transparent electrodes 21 and 22 of indium oxide ($In_2O_3$) and/or tin oxide ($SnO_2$), which may be provided with protective layers 51 and 52 of inert and transparent material, such as for example quartz.

The inner space formed by the glass plates 11, 12 and a glass solder web 4 is filled with a nematic liquid crystal substance 3. Here the rod-shaped molecules of the liquid crystal substance 3 are arranged when the cell is in the voltage-free condition such that the molecules touching the surface 21 or 51 of the glass plate 11 are located in the plane of the drawing, the layer of molecules 32 located between the glass plates 11, 12, is twisted out of the plane of the drawing by a given angle and the molecules 33 touching the surface 22 or 52 of the glass plate 12 are twisted up to 90° as compared with the first molecules 31 resting on the plate 11. Thus, the liquid crystal substance 3 has a helical twisted structure when the cell is in a voltage-less condition. This structure is achieved, for example, by rubbing the surface of the plates 21, 22 or 51, 52 with a cotton cloth in a preferential direction, because the molecules 31, 33, of the liquid crystal substance 3 attempt to arrange themselves along this preferential direction.

However, it has now been found that the molecules according to the manufacturing parameters have a greater or lesser angle of incidence α, that is to say that the molecules 31, or 33 do not adhere in their entire length to the surfaces 21, 22 or 51, 52 of the glass plates 11, 12, but that the molecules form with the longitudinal axis an angle α with their projection onto the surface of the plate. If this angle of incidence α varies by more than a prescribed value Δα, the representation of the information displayed by the liquid crystal cell becomes defective.

According to the invention, for example, a quantity of about 2.5 percent by weight of powdered manganese dioxide having a particle size of less than 7 μm is mixed with a glass solder powder having a particle size of less than 7 μm. The solder powder and the manganese dioxide are uniformly mixed with one another and after suspension in an organic binder are pressed on the edge as a solder web 4 onto the glass plates 11, 12. The solder web 4, according to the structure of the electrodes, rests on the electrodes 21, 22, and/or on the glass plates 11, 12 themselves or only on the protective layers 51, 52. After the alignment of the glass plates 11, 12, the liquid crystal cell is glass-soldered at about 500° C. When this is done the manganese dioxide acts as an oxidizing agent and prevents the reduction of the $In_2O_3$ and/or $SnO_2$ electrodes by uncombusted organic binder and therefore prevents the formation of local elements on the electrodes, so that after the glass-soldered liquid crystal cell has been filled with a liquid crystal substance through a filling aperture left in the glass solder web 4, the variation in the angle of incidence α remains below a prescribed value Δα.

Figure 2:
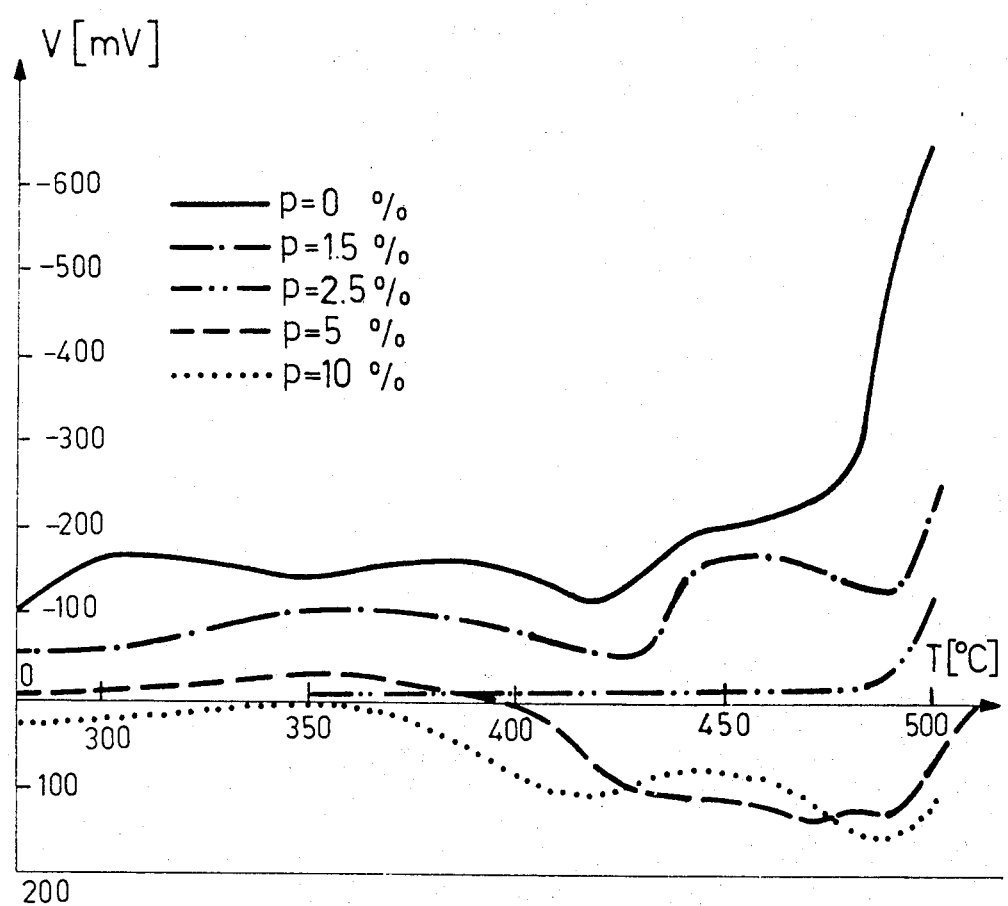

From the voltage/temperature curves of FIG. 2 it is possible to see particularly satisfactorily the prevention of the local element formation in liquid crystal cells according to the invention, and it is possible to determine the optimum addition of oxidizing agent to the glass solder powder. In these curves the voltage is measured between a free electrode and an electrode covered with glass solder, both of which are arranged on a glass plate. The two electrodes are located at a distance of approximately 1 mm with an edge length of 10 mm. The voltage V (mV) occurring between two electrodes as a function of the temperature T (°C) is now a measure of the occurrence brought about by the glass soldering of the local elements which bring about the enlarging of the angle of incidence α. It can be seen from the voltage/temperature curves that an admixture of more than 2.5 percent by weight of manganese dioxide prevents to a large extent the occurrence of harmful negative corrosion voltage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a liquid crystal cell having two flat glass plates aligned parallel to one another and at a distance from one another, a web of low-melting glass solder provided between the glass plates, a liquid crystal substance provided in the inner space formed by the glass plates and the glass solder web, and electrodes applied on the surfaces of the glass plates facing one another, said electrodes having connections thereto which are brought out of the inner space via the glass solder web, comprising the steps of:

mixing an oxidizing agent with the glass solder to form a first mixture; said oxidizing agent being 2.5 percent by weight of manganese dioxide;

mixing an organic binder to said first mixture to form a glass solder paste;

applying said glass solder paste on at least one of said glass plates provided with electrodes;

aligning said glass plates in relation to one another;

soldering said glass plates to form an inner space between said glass plates and said glass solder web, said oxidizing agent preventing the formation of electro-chemical corrosion effects on said electrodes during the soldering of said glass plates by oxidizing the uncombusted residue of the organic binder of the glass solder paste; and, filling said inner space with a liquid crystal substance having rod-shaped liquid crystal molecules in such a manner that the angle between the axis of the rod-shaped liquid crystal molecules and the projection of the liquid crystal molecules on the surfaces of the glass plates is substantially the same throughout said liquid crystal cell.

2. A process according to claim 1, wherein the proportion of the oxidizing agent comprises to 0.1 to 20 percent by weight of the quantity of glass solder.

3. A process according to claim 2, wherein the proportion of the oxidizing agent amounts to 1 to 5 percent, preferably more than 2.5 percent by weight of the quantity of the glass solder.

4. A process according to claim 1, wherein said oxidizing agent and said glass solder comprises powders mixed uniformly with one another.

5. A process according to claim 1, wherein said oxidizing agent has a particle size corresponding at most to the distance between the cell plates.

6. A process according to claim 1, wherein the glass soldering process is carried out at temperatures below 535° C.

* * * * *

UNITED STATES PATENT AND TRADEMARK OFFICE
CERTIFICATE OF CORRECTION

PATENT NO. : 4,252,415
DATED : February 24, 1981
INVENTOR(S) : Hans-Peter, Klein et al It is certified that error appears in the above-identified patent and that said Letters Patent are hereby corrected as shown below:

[75]  Inventors;  HANS-PETER KLEIN, Nussbaumen; and
HANS-RUDOLPH ZELLER, Birr, both of
SWITZERLAND Signed and Sealed this Twenty-ninth Day of September 1981

[SEAL]

Attest:

GERALD J. MOSSINGHOFF

Attesting Officer      Commissioner of Patents and Trademarks